UNITED STATES PATENT OFFICE 2,394,551

UNSATURATED KETONES OF THE CYCLO-PENTANO PHENANTHRENE SERIES

Percy L. Julian, Maywood, and John Wayne Cole, Chicago, Ill., assignors to The Glidden Company, Cleveland, Ohio, a corporation of Ohio No Drawing. Application April 16, 1941, Serial No. 388,900

2 Claims. (Cl. 260—397.3)

The present invention relates to the production of keto-ethylenes, and more particularly relates to keto-ethylenes containing a cyclo pentano phenanthrene nucleus.

An object of the present invention is to produce valuable intermediates useful in the synthesis of hormones.

Another object is to produce a new type of ketone useful in the preparation of hormones.

Another object is to produce new intermediates useful in the preparation of hormones.

Other objects will be apparent to those skilled in the art as the description proceeds.

We have discovered a new type of ketone, namely the group of ketones represented by the general Formula I, wherein R represents a phenyl radical.

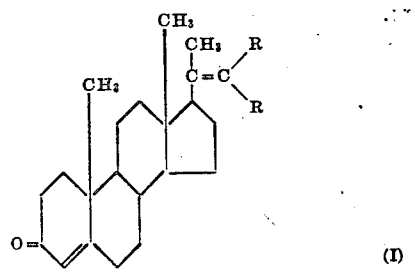

The development of the procedures described herein followed our discovery that these ketones crystallize with great ease from their solutions in most organic solvents. This is a most valuable property of an intermediate in an organic synthesis, since it enables purification by recrystallization accompanied by very little loss. Moreover these ketones can be prepared in remarkably good yield.

Three methods have been employed for preparing this type of ketone. The first, illustrated by Formulas II, III, IV and I, is particularly

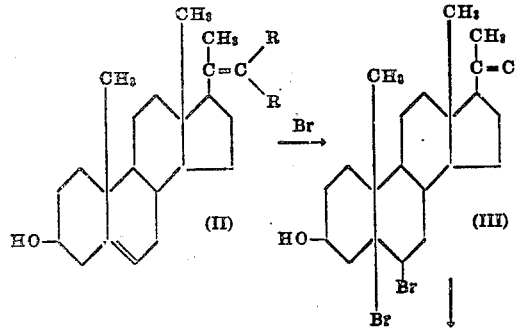

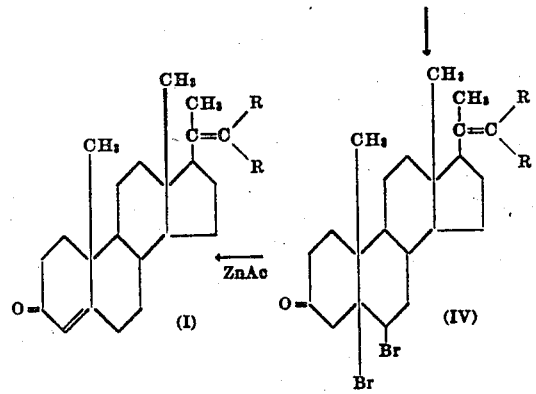

applicable where R represents an aromatic group such as phenyl. It will be noticed that only the nuclear double bond must be protected during the oxidation, which is carried out in such manner as to leave the side-chain double bond intact.

A second method of producing the desired ketones (I) utilizes a direct method for going from II to I, such as, for example, the method described by Oppenauer (Rec. Trav. Chim. 56, 137 (1937) for the interchange of hydrogen between alcohols and ketones. Thus when an alcohol represented by Formula II is heated with an aluminum alcoholate and a ketone such as cyclohexanone a good yield of a ketone of Formula I is obtained. Other direct methods may also be used.

In the third method either of the above procedures (modified) is used to convert di-alcohols of the general Formula V into ketones of the general

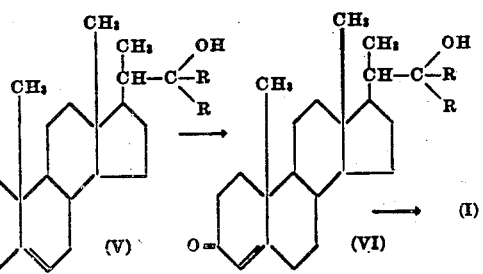

Formula VI. The latter upon dehydration yield the desired ketones of the general Formula I. Since some of the material is dehydrated unintentionally during the processing from substance V to substance VI, it is good economy to complete the dehydration to substance I before isolation and purification. This third method has the advantage that it can utilize as starting material the crude carbinols prepared in accordance with the procedures described in copending applications Serial No. 388,898 filed April 16, 1941 (Case A) now Patent No. 2,304,100 and Serial No. 388,899 filed April 16, 1941 (Case B) now Patent No. 2,304,101 or by treatment of 3-hydroxy or 3-acetoxy-bisnorcholenic acid esters with a Grignard reagent.

It is also apparent that this third method of procedure is applicable to the preparation of dibromoketones of Formula IV, in that the carbinols (V) can be brominated, followed by oxidation of the hydroxyl group at position 3 to the keto group and dehydration of the resulting keto carbinol to the bromo-ethylene (IV). Also procedures as described in this paragraph, as well as that represented by the schematic sequence (II) to (IV) above, represent needed contributions to the art, for the nuclear double bond in ketones like (I) cannot be saturated cleanly by direct bromination owing to side reactions.

It will be apparent to one skilled in the art that the procedures and products described in the above paragraphs will be very useful in preparation of certain of the sex hormones.

The following examples illustrate this invention:

Example 1

A solution of 4.66 grams (.01 mol) of $\Delta^5$3-hydroxy-etio-chlolenyl-methyl-diphenyl-ethylene (II), (R=$C_6H_5$) in 40 cc. of chloroform is cooled in an ice bath and treated with a solution of 1.6 grams (.01 mol) of bromine in 16 cc. of chloroform. The resulting colorless solution is evaporated to dryness and the residue covered with 4 cc. of acetone, whereupon the product crystallizes almost completely. This material separates in the form of colorless platelets which melt at about 186° C. with decomposition and is 3-hydroxy-5,6-dibromo-etio-cholanyl-methyl-diphenyl-ethylene of the formula $C_{34}H_{42}OBr_2$ (Formula III, R=$C_6H_5$).

A solution of 6.26 g. of the dibromo-compound (III) (as described above) in 100 cc. of warm glacial acetic acid is mixed with a solution of 1.0 g. of chromium trioxide in 2 cc of water and 100 cc. of glacial acetic acid. After standing for 3 hours at 30° C. the mixture is diluted with several volumes of water then extracted with ether. The ether solution, after being washed with sodium carbonate solution and with water, is evaporated to dryness and the residue covered with 10 cc. of methanol. The crystals which separate in good quantity are colorless needles, melting at about 173° C. with decomposition, and represent 3-keto-5,6-dibromo-etio-cholanyl-methyl-diphenyl-ethylene of the formula $C_{34}H_{40}OBr_2$ (Formula IV, R=$C_6H_5$).

A solution of 2 grams of the above dibromo-ketone ((IV), R=$C_6H_5$) in 100 cc. of ether and 15 cc. of glacial acetic acid is treated with 2 grams of zinc duct, the mixture being warmed and stirred for fifteen minutes. The ether solution is decanted from the excess zinc, which is washed with 100 cc. benzene and the ether-benzene solution is washed, first with dilute acid, then with sodium carbonate solution and finally several times with water. Concentration of the ether-benzene solution causes the separation of prisms of $\Delta^4$-3-keto-etio-cholenyl-methyl-diphenyl-ethylene, which melts at about 229° C. and has the composition represented by the formula $C_{34}H_{38}O$ (Formula I, R=$C_6H_5$).

Example 2

A mixture of 2.2 grams of $\Delta^5$-3-hydroxy-etio-chloleny-methyl-diphenyl-ethylene (Formula II, R=$C_6H_5$), 32 cc. of toluene, 8 cc. cyclohexanone and 1.5 grams aluminum tertiary butylate is heated and caused to reflux gently for 20 minutes. The mixture is promptly cooled, poured into cold 5% hydrochloric acid and extracted with toluene. The toluene solution is washed with fresh 5% hydrochloric acid then several times with water. Evaporation of the solvents and addition of 5 cc. of acetone to the residue causes the formation of 1.9 grams of colorless prisms, which melt at about 229° C. (uncorr.) and consists of $\Delta^4$-3-keto-etio-cholenyl-methyl-diphenyl-ethylene (Formula I, R=$C_6H_5$).

Example 3

The crude product obtained by treating 8 grams of $\Delta^5$-3-hydroxy-bisnorcholenic acid with phenyl-magnesium bromide as described in copending application Serial No. 388,899, filed April 16, 1941, now Patent No. 2,304,101, after being hydrolyzed with dilute acid and treated with live steam, is dried, dissolved in 100 cc. of toluene, 20 cc. of cyclohexanone and treated with 7.5 grams of aluminum butylate. The mixture is heated and caused to reflux gently for 20 minutes, then promptly poured into cold 5% sulfuric acid. The toluene layer is washed with dilute acid and several times with water, then treated with live steam until practically no more volatile material was carried out by the steam. The residue may deposit a few crystals of crude $\Delta^4$-3-keto-etio-choleny-methyl-diphenyl-ethylene (Formula I, R=$C_6H_5$) of melting point 210°–215° C., which after recrystallization from methyl-ethyl-ketone, melt at 228-229°. An improved yield is obtained by refluxing the whole material in 50 cc. of glacial acetic acid for 30 minutes, then concentrating the solution to about 35 cc. whereupon crystals of the $\Delta^4$-3-keto-etio-cholenyl-methyl-diphenyl-ethylene ((I), R=$C_6H_5$) separate abundantly.

Having described the invention, what we claim is:

1. A 3-keto-5,6-dibromo-etio-cholanyl-methyl-diphenyl-ethylene, having the molecular formula $C_{34}H_{40}OBr_2$, and having a melting point of about 173° C.

2. A $\Delta^4$-3-keto-etio-cholenyl-methyl-diphenyl-ethylene having the molecular formula $C_{34}H_{40}O$ and having a melting point of about 229° C.

PERCY L. JULIAN.
JOHN WAYNE COLE.